United States Patent
Barrenscheen et al.

(10) Patent No.: US 7,337,343 B2
(45) Date of Patent: Feb. 26, 2008

(54) ARRANGEMENT CONSISTING OF A PROGRAM-CONTROLLED UNIT AND A POWER CHIP CONNECTED TO IT

(75) Inventors: Jens Barrenscheen, Munich (DE); Peter Rohm, Pfaffenhofen (DE)

(73) Assignee: Infineon Technologies AG (DE)

( * ) Notice: Subject to any disclaimer, the term of this patent is extended or adjusted under 35 U.S.C. 154(b) by 574 days.

(21) Appl. No.: 10/727,101

(22) Filed: Dec. 2, 2003

(65) Prior Publication Data

US 2004/0217385 A1 Nov. 4, 2004

(51) Int. Cl.
*G06F 1/00* (2006.01)
*G05B 24/00* (2006.01)

(52) U.S. Cl. ........ 713/340; 323/318
(58) Field of Classification Search ........ 713/340; 323/318

See application file for complete search history.

(56) References Cited

U.S. PATENT DOCUMENTS

| | | | |
|---|---|---|---|
| 4,682,294 A | | 7/1987 | Duc et al. |
| 4,786,826 A | * | 11/1988 | Clemente ........ 327/541 |
| 5,537,070 A | * | 7/1996 | Risinger ........ 327/170 |
| 5,606,662 A | | 2/1997 | Wisor |
| 5,760,563 A | * | 6/1998 | Bennett et al. ........ 318/641 |
| 5,811,997 A | * | 9/1998 | Chengson et al. ........ 327/112 |
| 6,317,458 B1 | | 11/2001 | Boggs et al. |

FOREIGN PATENT DOCUMENTS

| | | |
|---|---|---|
| EP | 0 418 665 A1 | 3/1991 |
| EP | 0-489-944 A1 | 6/1992 |
| EP | 197-45-210 A1 | 5/1999 |

* cited by examiner

*Primary Examiner*—Chun Cao
*Assistant Examiner*—Ji H Bae
(74) *Attorney, Agent, or Firm*—Dickstein, Shapiro, LLP.

(57) ABSTRACT

An arrangement including a program-controlled unit and a power chip, the power chip connected to drive electric loads in accordance with load control data, and the program-controlled unit transmitting the load control data and power chip control data, and the power chip transmitting to the program-controlled unit diagnostic data. The program-controlled unit, by transmitting corresponding control data to the power chip, can input the behavior of the output drivers of the power chip and/or configure protective mechanisms present in the power chip and/or input to the power chip the format of the diagnostic data to be output and/or input to the power chip when it has to output what diagnostic data and/or input to the power chip which load is to be controlled by which load control data section, and/or input to the power chip whether the load control data contains redundant data suitable for detecting transmission errors.

18 Claims, 2 Drawing Sheets

ARRANGEMENT CONSISTING OF A PROGRAM-CONTROLLED UNIT AND A POWER CHIP CONNECTED TO IT

FIELD OF THE INVENTION

The present invention relates to an arrangement including a program-controlled unit and a power chip connected to the program-controlled unit.

BACKGROUND OF THE INVENTION

Conventional arrangements including a program-controlled unit and a power chip are typically arranged such that
the power chip is additionally connected to electric loads, and drives these electric loads in accordance with timing input to it by means of load control data,
the program-controlled unit transmits to the power chip the abovementioned load control data and control data controlling the power chip, and
the power chip transmits to the program-controlled unit diagnostic data by means of which states prevailing in the power chip or events occurring are represented.

In the present case, the program-controlled unit mentioned shall be a microcontroller but can also be, for example, a microprocessor or a signal processor.

In the microcontroller, a control program is executed by means of which it is defined how the electric loads connected to the power chip are to be driven. However, the microcontroller does not itself drive the loads but does this via the power chip.

The power chip essentially does nothing else except drive the electric loads connected to it in accordance with the inputs received from the microcontroller.

Such arrangements are used, for example, when the microcontroller is not capable of driving the electric loads itself. This is the case, in particular, when the voltages and/or currents to be supplied to the loads are of such a magnitude that the microcontroller cannot generate them itself, or could only generate them itself at an expenditure which is not justifiable.

Such arrangements are used, for example, but not exclusively, in motor vehicle control devices. Motor vehicle control devices must control, among other things, a whole number of loads by supplying energy and interrupting the energy supply. Most of the loads must be supplied with voltages which are so high (for example 12 V) and/or currents which are so high (for example 1 A and greater) that they cannot be generated by a microcontroller, but can be generated quite easily by a power chip.

The power chip can be configured by the microcontroller and is provided with the timing for the load control by the microcontroller.

The power chip is configured by transmitting data, called control data in the text which follows, from the microcontroller to the power chip. By means of the configuration of the power chip, it is possible to set in it, for example, whether it is to operate in normal mode or in a special mode, for example in sleep mode.

Inputting the timing for the load control is done by transmitting signals or data, called load control data in the text which follows, to the power chip. The load control data used can be, for example, pulse-width-modulated signals generated by a timer of the microcontroller.

The power chip conveys to the microcontroller status information by means of which states prevailing in the power chip or events occurring are signaled to the microcontroller. The status information is conveyed by transmitting data, called diagnostic data in the text which follows, to the microcontroller. By means of these diagnostic data, it is possible to signal to the microcontroller, for example, that a load is drawing too much current or that there is an excessive temperature.

In arrangements of the type described above, the transmission of the load control data, among other things, represents a problem.

Until recently, the transmission was carried out in such a manner that, for each load connected to the power chip, a separate pulse-width-modulated signal was transmitted on its own line to the power chip.

This type of load control data transmission is disadvantageous because the microcontroller and the power chip must be connected to one another via a very large number of lines in this case and must have a correspondingly large number of input and/or output connections.

In the meantime, this problem has already been recognized and ameliorated by the development of the so-called microsecond bus. The microsecond bus exhibits the special feature that the load control signals previously transmitted to the power chip in parallel are sampled at regular time intervals, for example at time intervals of 1 µs, and that the samples are transmitted serially to the power chip via a single transmission channel. From the data supplied to it, the power chip reconstructs the sampled pulse-width-modulated signals and appropriately drives the loads connected to it. This makes it possible to achieve a considerable reduction in the lines to be provided between the microcontroller and the power chip and the number of input and/or output connections of the microcontroller and of the power chip to be provided is also correspondingly lower.

FIG. 1 shows the basic configuration of an arrangement in which a microcontroller and a power chip are connected to one another via a microsecond bus.

FIG. 1 shows a microcontroller MC, a power chip PC and a microsecond bus MSB connecting the microcontroller and the power chip.

The microcontroller MC contains a central processing unit CPU, a timer T1, a microsecond bus controller MSC, and various other units P1 to Pn, said components being connected to one another via an internal system bus SYSBUS.

The timer T1 generates the timing of the pulse-width-modulated signals providing load control, and supplies these to the microsecond bus controller MSC via the system bus SYSBUS. In the example considered, the timer generates a total of 16 output signals, each of which comprises one bit, and indicates whether a condition set in the timer and allocated to the respective timer output signal is met or not. The timer output signals are transmitted at particular time intervals, for example at time intervals of 1 µs, to the microsecond bus controller MSC which serially transmits these signals to the power chip PC via the microsecond bus MSB.

The microsecond bus MSB comprises a first transmission channel TC1 and a second transmission channel TC2, the first transmission channel TC1 consisting of lines DATA1*a*, DATA1*b*, CLK1 and CS1, and the second transmission channel TC2 consisting of lines DATA2, CLK2 and CS2.

Via line CLK2, the microcontroller MC transmits a transmission clock signal to the power chip PC.

Via the line DATA2, the microcontroller MC serially transmits the respective current levels of the timer output signals, that is to say the load control data, to the power chip PC at the rate of the transmission clock signal transmitted via the line CLK2.

Via line CS2, the microcontroller MC transmits to the power chip PC a chip select signal by means of which the beginning and the end of the transmission of data intended for the power chip are signaled to the power chip via the line DATA2.

Via line CLK1, the microcontroller MC transmits a transmission clock signal to the power chip PC.

Via line DATA1a, the microcontroller MC serially transmits control data to the power chip PC at the rate of the transmission clock signal transmitted via the line CLK1 and, in synchronism therewith, the power chip PC serially transmits diagnostic data to the microcontroller via the line DATA1b.

Via line CS1, the microcontroller MC transmits to the power chip PC a chip select signal by means of which the beginning and the end of the transmission of data intended for the power chip are signaled to the power chip via line DATA1a.

As can be seen from the above explanations, the number of lines between the microcontroller MC and the power chip PC, and thus also the number of input and/or output connections of the microcontroller and of the power chip, can be considerably reduced by using the microsecond bus. Between the microcontroller MC and the power chip PC only 7 lines need to be provided now; during the transmission of the timer output signals via a separate line in each case, 16 lines would have to be provided just for the transmission of the timer output signals.

Experience shows that various problems remain unsolved even when the microsecond bus is used. In particular, the behavior of the power chip can provide problems at times. This can significantly restrict the possibilities for using the conventional arrangement described above.

SUMMARY OF THE INVENTION

The present invention is therefore based on the object of developing the arrangement in such a manner that it can be adapted in a simple manner to the given requirements and can thus be used in any system.

The arrangement according to the invention is distinguished by the fact that the program-controlled unit, by transmitting corresponding control data to the power chip, can input the behavior of the output drivers of the power chip, and/or configure protective mechanisms present in the power chip, and/or input to the power chip the format of the diagnostic data to be output, and/or input to the power chip when it has to output what diagnostic data, and/or input to the power chip which load is to be controlled, taking into consideration which load control data section, and/or input to the power chip whether the load control data contain redundant data suitable for detecting transmission errors, and what these redundant data are.

As a result, the arrangement can be adapted optimally to the given conditions and requirements in a rapid and simple manner.

Advantageous developments of the invention can be found in the description following and the figures.

BRIEF DESCRIPTION OF THE DRAWINGS

In the text which follows, the invention will be explained in greater detail by means of exemplary embodiments and referring to the figures, in which.

DETAILED DESCRIPTION OF THE DRAWINGS

The program-controlled unit of the arrangement described in the text which follows is a microcontroller but could also be, for example, a microprocessor, or a signal processor.

Figure 2:
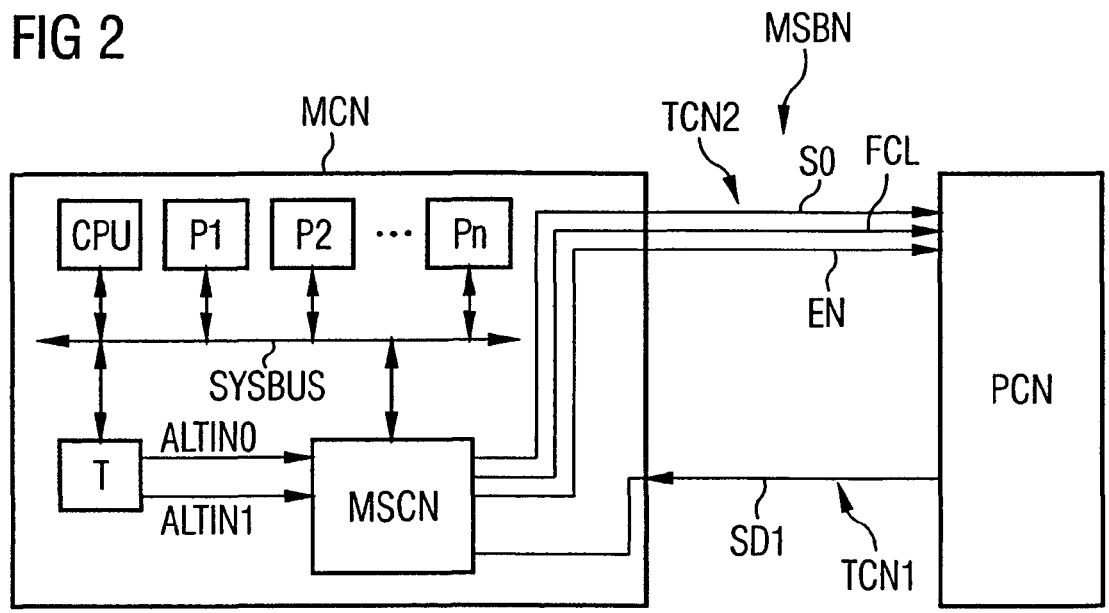
FIG. 2 shows the configuration of the arrangement described in the text which follows.

FIG. 2 shows the basic configuration of an exemplary embodiment of the arrangement presented here.

The arrangement shown in FIG. 2 contains a microcontroller MCN, a power chip PCN, and a modified microsecond bus MSBN connecting said chips to one another.

Figure 1:
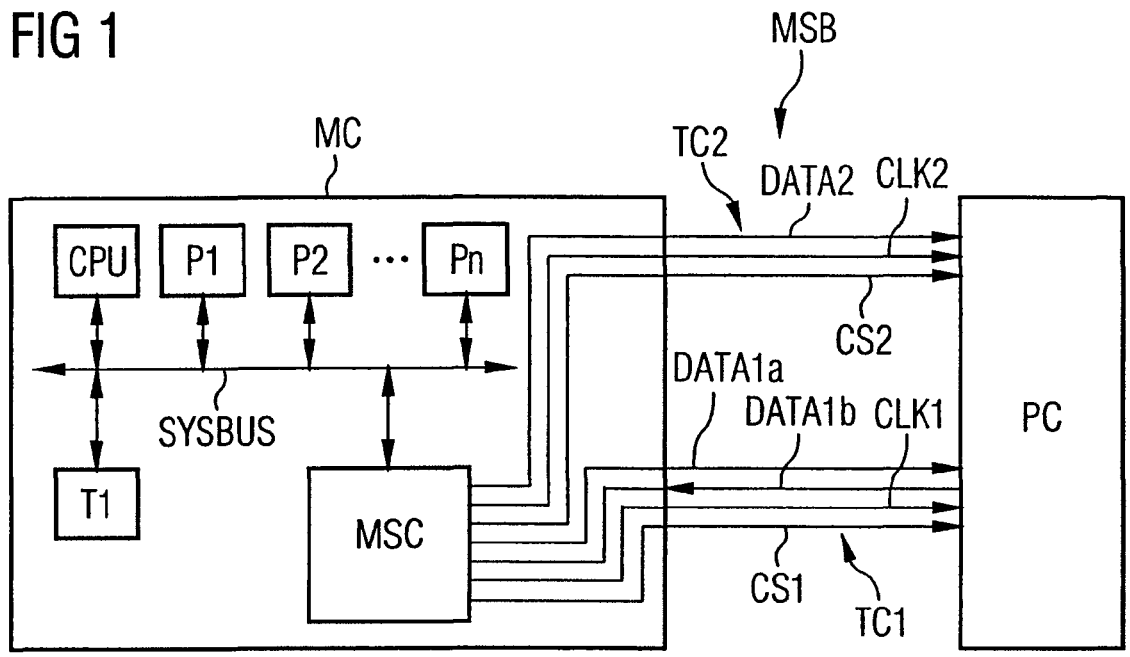
FIG. 1 shows the configuration of the conventional arrangement described initially.

The modified microsecond bus MSBN is a second-generation microsecond bus and, for the sake of simplicity, will be called microsecond bus in the text which follows. However, this does not mean that this is the microsecond bus described initially with reference to FIG. 1. By comparison with the first-generation microsecond bus described initially, the second-generation microsecond bus described here exhibits a whole number of differences which will still be described in greater detail later.

The microcontroller MCN contains a central processing unit CPU, a timer T, a microsecond bus controller MSCN, and various other units P1 to Pn, said components being connected to one another via an internal system bus SYSBUS, and the timer T and the microsecond bus controller MSCN being connected to one another via additional internal buses ALTIN0 and ALTIN1.

The timer T generates the timer output signals to be transmitted to the power chip PCN and supplies them to the microsecond bus controller MSCN via the buses ALTIN0 and ALTIN1. In the example considered, the timer generates a total of 32 output signals, each of which comprises one bit, and indicates whether a condition set in the timer and allocated to the respective timer output signal is met or not. The timer output signals are transmitted at particular time intervals, for example at time intervals of 1 µs, to the microsecond bus controller MSCN which serially transmits these signals to the power chip PCN via the microsecond bus MSBN.

The microsecond bus MSBN comprises a first transmission channel TCN1 and a second transmission channel TCN2, the first transmission channel TCN1 consisting of a signal line SD1, and the second transmission channel TCN2 consisting of lines S0, FCL and EN.

The microcontroller MCN transmits a transmission clock signal to the power chip PCN via line FCL. The line FCL corresponds to the line CLK2 of the conventional arrangement shown in FIG. 1. However, the transmission clock signal transmitted via the line FCL will generally have a higher frequency than the transmission clock signal transmitted via the line CLK2.

The microcontroller MCN serially transmits load control data and control data at the rate of the transmission clock signal transmitted via the line FCL to the power chip PCN via the line S0. The load control data have the same content as the data transmitted via line DATA2 of the arrangement shown in FIG. 1. However, control data can be transmitted between load control data transmissions. The data to be transmitted via line S0 are thus transmitted in time-division multiplex. This will be described in greater detail later.

Via the line EN, the microcontroller MCN transmits to the power chip PCN a chip select signal by means of which the beginning and the end of the transmission of data intended for the power chip are signaled to the power chip via the data line S0. The line EN corresponds to the line CS2 of the conventional arrangement shown in FIG. 1.

The power chip PCN serially transmits diagnostic data to the microcontroller via the line SD1. The diagnostic data are preferably transmitted asynchronously. These and other possibilities of transmission will be described in greater detail later.

As mentioned, the data to be transmitted via the line S0, that is to say the load control data and the control data, are transmitted in time-division multiplex.

The microsecond bus controller MSCN internally generates constant-length time windows and transmits either load control data, control data or no data in each time window. The transmission of the data to be transmitted in each case is always started at the beginning of a time window. In the example considered, the load control data are transmitted in such a manner that a time window in which load control data have been transmitted to the power chip is always followed by n time windows in which no load control data are transmitted to the power chip so that load control data are thus transmitted to the power chip in each n+1th time window, where n is a value which can be set by the CPU of the microcontroller and, in the example considered, is between 0 and 15. In the time windows which are not reserved for the transmission of load control data, control data can be transmitted to the power chip.

A special case exists if n=0. In this case, there are no time windows which are not reserved for the transmission of load control data. In the case of n=0, the procedure is, therefore, that the transmission of control data has priority over the transmission of load control data, i.e., if there are control data to be transmitted to the power chip which are present in the microsecond bus controller MSCN, these control data are transmitted instead of the load control data which actually had to be transmitted. The fact that the transmission of control data has priority over the transmission of load control data can also be provided if n is between 1 and 15.

In the example considered, the load control data transmitted per time window comprise in each case 32 bits, each of which is intended for controlling a different load; in the example considered, the microcontroller can control up to 32 loads. In the example considered, the control data transmitted per time window also in each case comprise 32 bits but can also comprise more bits or fewer bits. Both the load control data and the control data are transmitted together with an information item by means of which the power chip can determine whether the data transmitted in each case are load control data or control data.

Figure 3:
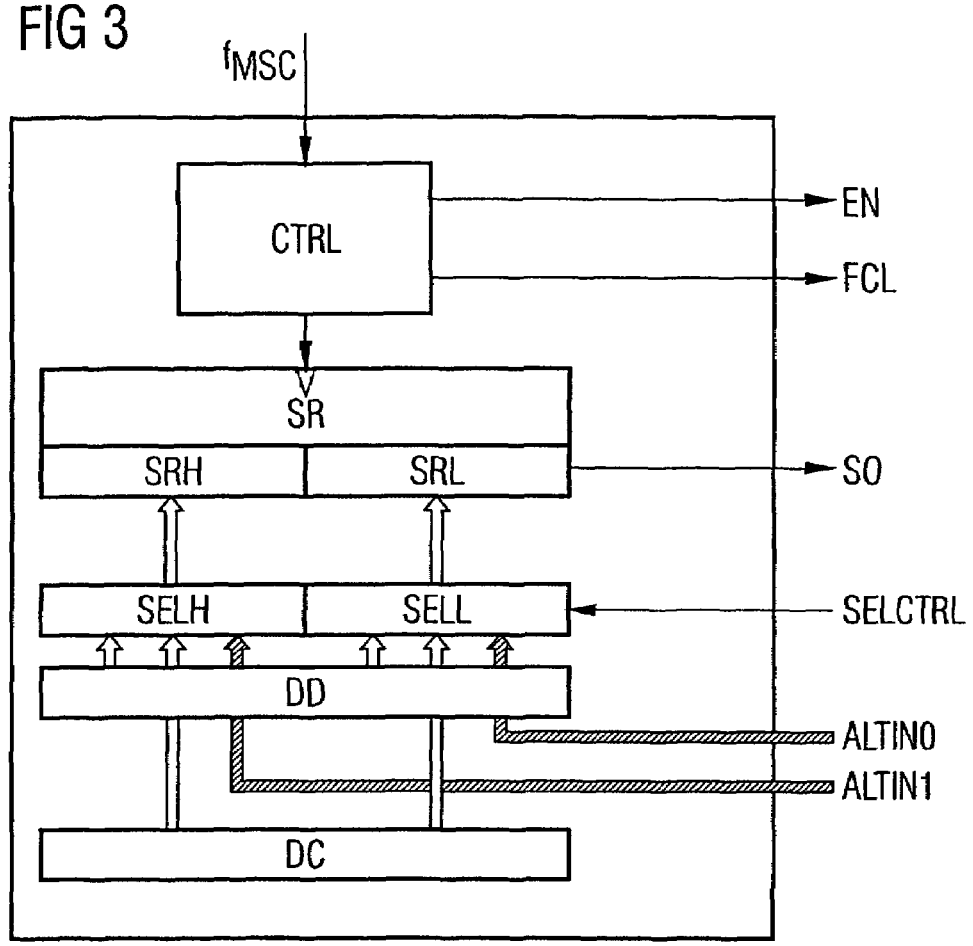
FIG. 3 shows the configuration of a section of the microsecond bus controller contained in the arrangement according to FIG. 2.

In the text which follows, the configuration of the section of the microsecond bus controller MSCN which outputs the data transmitted via lines FCL, S0 and EN to these lines is described with reference to FIG. 3.

The section of the microsecond bus controller MSCN shown comprises a control device CTRL, a shift register unit SR comprising shift registers SRH and SRL, selection devices SELH and SELL, a data register DD and a command register DC.

The control device CTRL
generates from a clock signal $f_{MSC}$ supplied to the control device the transmission clock signal to be transmitted via line FCL, and outputs it to line FCL,
generates the chip select signal to be transmitted via line EN, and outputs it to line EN, and
controls the shift register unit SR.

The command register DC is a register comprising 32 bits, in which control data to be transmitted to the power chip are stored. These data are generated by the CPU and written into the command register DC via the system bus SYSBUS.

The data register DD is a register comprising 32 bits, in which load control data are stored. These data are generated by the CPU and written into the data register DD via the system bus SYSBUS.

The selection devices SELH and SELL are devices preceding the shift registers SRH and SRL, by means of which it is determined what data are written into the shift registers.

The selection device SELL is supplied with the 16 least significant bits of the command register DC, the 16 least significant bits of the data register DD and the data transmitted via bus ALTIN0 and comprising 16 bits. The selection device SELH is supplied with the 16 most significant bits of the command register DC, the 16 most significant bits of the data register DD and the data transmitted via bus ALTIN1, which also comprise 16 bits. The selection devices SELL and SELH have a control connection SELCTRL via which it is possible to set what data supplied to the selection devices SELL and SELH are forwarded to the shift registers SRL and SRH. The determination takes place bit by bit, i.e. it is possible to specify for each individual bit of the data forwarded to the shift registers SRL and SRH the source from which it comes.

The selection devices SELL and SELH are controlled by the CPU of the microcontroller, or by the control device CTRL.

The data forwarded to the shift registers SRL and SRH are transferred into these in parallel and are then serially output to line S0 at the rate of the transmission clock signal transmitted via line FCL.

At the same time as the transmission of data begins via line S0, the chip select signal transmitted via line EN changes from the low level to the high level (or conversely). After the data to be transmitted within a time window have been transmitted, more precisely essentially at the same time as this happens, the chip select signal changes from the high level back to the low level (or conversely) again. The chip select signal signals the beginning and the end of the transmission of data intended for the power chip to the power chip via line S0.

The microsecond bus controller MSCN is capable of driving a number of power chips. As a result, the microsecond bus controller MSCN can also drive more loads than would be the case if the microsecond bus controller MSCN were only able to drive a single power chip.

If the microsecond bus controller MSCN is to be capable of driving loads connected to different power chips, an additional chip select line EN must be provided for each further power chip. Thus, if the microsecond bus controller MSCN is to be able to transmit load control data to four power chips, for example, four chip select lines EN1 to EN4 must be provided, each of these chip select lines being connected to precisely one power chip, that is to say, for example, chip select line EN1 to the first power chip, chip select line EN2 to the second power chip, chip select line EN3 to the third power chip and chip select line EN4 to the fourth power chip. However, it is not necessary to provide a number of lines FCL and also not a number of lines S0. The existing single FCL line and the existing single S0 line are in each case connected to all power chips. The power chip for which the data or signals transmitted via lines FCL and S0 are intended is signaled to the power chips by the chip select signals transmitted via the chip select lines EN1 to EN4.

The microsecond bus controller MSCN considered has the special feature that the load control data output within a time window can be intended for different power chips, that is to say, for example, the first 16 bits of these data for a first power chip and the remaining 16 bits for another power chip, i.e., the microsecond bus controller MSCN considered is capable of switching over the chip select signals during the transmission of load control data transmitted as a contiguous unit. Incidentally, this is the reason why the shift register unit SR contains not only a single shift register comprising 32 bits but two 16-bit shift registers SRL and SRH.

As has already been mentioned above, the diagnostic data transmitted from the power chip to the microcontroller via line SD1 are preferably transmitted asynchronously. The diagnostic data are transmitted in units of frames which in each case comprise 12 bits in the example considered. The structure of such a frame is illustrated in FIG. 4.

Figure 4:
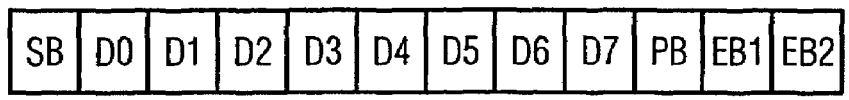
FIG. 4 shows the structure of a diagnostic data frame.

The frame shown in FIG. 4 contains a start bit SB used for synchronization which always has the value "0" in the example considered,
diagnostic data D0 to D7, comprising 8 bits,
a parity bit PB used for error control,
two stop bits EB1 and EB2 used for synchronization which always have the value "1" in the example considered.

It should be clear and does not need to be explained in greater detail that the frame could also have a different structure. In particular, the diagnostic data can have arbitrarily many more or fewer bits and the frame does not necessarily need to contain one parity bit. In addition, it could be provided that the frame only contains one stop bit.

The power chip generates the transmission clock used by the power chip for transmitting the bits of the diagnostic data frames from the transmission clock transmitted to it via line FCL: the power chip divides the transmission clock supplied to it via line FCL by a divider factor input to it and uses the resultant clock as transmission clock for the transmission of the diagnostic data. The divider factor is input to the power chip by the microcontroller. The microcontroller conveys control data which, among other things, contain the divider factor to be used, to the power chip on its initialization.

Since the transmission clock used for the transmission of the diagnostic data is generated in the power chip in accordance with the inputs from the microcontroller and thus is known to the microcontroller, it is not necessary to transmit a clock signal representing the transmission clock to be used or used for the transmission of the diagnostic data either from the microcontroller to the power chip or from the power chip to the microcontroller. As a result, the transmission clock line CLK1, which is still present in the first-generation microsecond bus, can be omitted without being replaced.

Since only data are transmitted via the line SD1 from the power chip to the microcontroller, the chip select line CS1 still present in the first-generation microsecond bus can also be omitted without being replaced.

The same positive effects could be achieved if the start and stop bits are omitted in the diagnostic data frames and the microcontroller determines the phase angle of the diagnostic data by oversampling the diagnostic data.

A further alternative consists in that the first transmission channel TCN1 also comprises a transmission clock line via which a transmission clock signal is transmitted from the microcontroller to the power chip or from the power chip to the microcontroller, and in that the power chip transmits the diagnostic data at the rate of this transmission clock signal. Although an additional line must be provided for this purpose, the total number of lines to be provided between the microcontroller and the power chip is still less than in the first-generation microsecond bus initially described.

It is especially when the microcontroller and the power chip are far apart, that is to say long lines must be provided between them, that the output drivers of the microcontroller must be very strong drivers. This can create strong electromagnetic interference.

To avoid this, it can be provided to use special drivers which cause only relatively weak electromagnetic interference. Such drivers are, for example, the so-called Low Voltage Differential Signaling (LVDS) drivers. When LVDS drivers are used, the data to be transmitted are transmitted on two lines instead of only one line, the data or signals actually to be transmitted being transmitted on one line and complementary data or signals being transmitted on the other line.

When the microcontroller has such drivers, it transmits the data transmitted by it via line S0 in the exemplary embodiment shown in FIGS. 2 and 3 and described with reference to these via two lines S0P and S0N, the data which are transmitted via line S0 in the exemplary embodiment shown in FIGS. 2 and 3 being transmitted via line S0P and the complementary data, i.e., the data inverted by an inverter, being transmitted via line S0N. This correspondingly applies to the data which are transmitted via line FCL in the exemplary embodiment shown in FIGS. 2 and 3 and described with reference to these. When LVDS drivers are used, these data or signals are transmitted via two lines FCLP and FCLN, the data which are transmitted via line FCL in the exemplary embodiment shown in FIGS. 2 and 3 being transmitted via line FCLP and the complementary data, i.e., the data inverted by an inverter, being transmitted via line FCLN.

It is not necessary to use LVDS drivers or other Electro-Magnetic Capability (EMC)-optimized drivers for the data transmitted via lines EN and SD1 because the data transmitted via these lines change their level comparatively rarely and, in consequence, only cause little electromagnetic interference.

It could also be provided that both normal drivers and LVDS drivers are provided for the data or signals to be transmitted via lines FCL and S0, and that the microcontroller has connections for lines FCL, FCLP and FCLN and for lines S0, S0P and S0N. In this case, it could be made a condition of the respective situations whether the load control data and the control data are transmitted by a normal driver and a single line S0 or by LVDS drivers and two lines S0P and S0N and whether the transmission clock signal is transmitted by a normal driver and a single line FCL or by LVDS drivers and two lines FCLP and FCLN.

A further special feature of the arrangement described above consists in that the microcontroller can control the power chip more flexibly than is the case in conventional arrangements of this type.

In the text which follows, some of the existing possibilities for controlling the power chip by means the microcontroller are presented. Said operations controlling the power chip by means of the microcontroller in each case take place by transmitting corresponding control data to the power chip.

One of the existing possibilities for controlling the power chip by means of the microcontroller consists in that the microcontroller can set the behavior of the output driver of the power chip which outputs the diagnostic data by transmitting corresponding control data to the power chip. In particular, it is possible to set whether the diagnostic data output driver operates in accordance with the push/pull method or in accordance with the open-drain method and how steep the edges of the signals output by the diagnostic data output driver should be.

A further possibility for controlling the power chip by means of the microcontroller consists in that the microcontroller can set the behavior of the output drivers of the power chip controlling the loads by transmitting corresponding control data to the power chip. In particular, the timing of processes running in the output drivers can be adjusted, for example the time interval in which the drive of transistors contained in the output drivers is changed, which transistors must be simultaneously brought from the conducting state into the non-conducting state or conversely, but cannot switch at the same speed and can cause a short circuit if the drive is simultaneously changed. In addition, the microcontroller can also adjust the edge steepness of the voltages and currents output from these output drivers by transmitting corresponding control data to the power chip.

A further possibility for controlling the power chip by means of the microcontroller consists in that the microcontroller, by transmitting corresponding control data to the power chip, can configure the protective mechanisms of the power chip. The protective mechanisms existing in the power chip make it possible to monitor, for example, the temperature of the power chip and the currents drawn by the loads. In the arrangement considered, the microcontroller is able to set in the power chip, among other things, how the power chip responds to the detection of an abnormal state or an abnormal event and what conditions must be present for grading a state or event as abnormal. In the example considered, the response to the detection of an abnormal state optionally consists in the conveying of a corresponding message and/or in the independent taking of measures for eliminating the abnormal state. In addition, it is possible in the arrangement described to adapt the conditions which must be met for grading the existing state as an abnormal state to changing situations. More precisely, in the example considered, said conditions are determined taking into consideration the behavior of the loads with time. For example, it can be provided that the permissible current which is allowed to be drawn by a load connected to the power chip is greater a certain time after the beginning of the supply of energy to the load than thereafter. This is taken into consideration by the microcontroller in that it initially conveys a high current limit value to the power chip and a longer or shorter time thereafter conveys a lower limit value adapted to the changed situations. It would also be possible to input limit values of different magnitudes into the power chip right at the start and to define the time when which limit value is to be used.

A further possibility for controlling the power chip by means of the microcontroller consists in that the microcontroller, by transmitting corresponding control data to the power chip, can set the transmission clock rate at which the power chip transmits the diagnostic data. This has already been explained above.

A further possibility for controlling the power chip by means of the microcontroller consists in that the microcontroller, by transmitting corresponding control data to the power chip, can cause selected diagnostic data to be output. In this case, the power chip can be designed in such a manner that it only outputs diagnostic data following a corresponding initiation by the microcontroller and that the power chip does not always output all diagnostic data which it is capable of outputting but only the diagnostic data requested by the microcontroller. Conventional power chips in each case output all diagnostic data which they are capable of outputting at greater or lesser time intervals on their own initiative. On the one hand, this represents a high loading both on the power chip and on the microcontroller and, on the other hand, it can lead to the microcontroller responding to abnormal states or events only a relatively long time after the occurrence of the abnormal state or the abnormal event.

Figure 5:
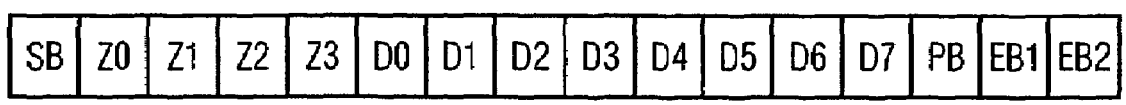
FIG. 5 shows the structure of a modified diagnostic data frame.

A further possibility for controlling the power chip by means of the microcontroller consists in that the microcontroller, by transmitting corresponding control data to the power chip, defines the format of the diagnostic data. In particular, it is possible for the microcontroller to input to the power chip that the diagnostic data output by it contain, in addition to the actual diagnostic data, additional information about the power chip outputting the diagnostic data and/or about the information represented by the diagnostic data and what this information consists of in detail. In the example considered, the microcontroller can cause the power chip to use a diagnostic data frame shown in FIG. 5 instead of the diagnostic data frame used in FIG. 4. The diagnostic data frame shown in FIG. 5 largely corresponds to the diagnostic data frame shown in FIG. 4; bits designated by the same reference symbols designate mutually corresponding bits. However, the diagnostic data frame shown in FIG. 5 contains four additional information bits $Z0$ to $Z3$, the additional information bits $Z0$ and $Z1$ containing information about the power chip from which the diagnostic data are coming and the additional information bits $Z2$ and $Z3$ containing information about which information is represented by the data contained in bits $D0$ to $D7$, that is to say, for example, whether these data relate to a temperature or to a current. In addition, the microcontroller inputs to the power chip what content the additional information bits $Z0$ to $Z3$ must have in each case.

A further possibility for controlling the power chip by means of the microcontroller consists in that the microcontroller, by transmitting corresponding control data to the power chip, specifies the correlation between the bits of the load control data frames and the loads to be controlled thereby. Such a specification makes it possible to input to the power chip, for example, that it has to use the nth bit of the load control data frames for controlling the mth load or that it has to use the nth bit of the load control data frames for controlling the nth load and the mth load.

A further possibility for controlling the power chip by means of the microcontroller consists in that the microcontroller, by transmitting corresponding control data to the power chip, informs the power chip whether the load control data contain redundant data suitable for detecting transmission errors and what these redundant data are. In this manner, the power chip receives, for example, the information that bits n and m of the load control data frames are mutually corresponding (or complementary) data. The power chip can thus check, by comparing bits n and m of the load control data frames, whether the load control data have been transmitted error-free or not. This possibility can be used, in particular, if fewer loads are connected to the power chip than could be connected or if a number of loads of the loads connected are to be driven in an identical manner.

Utilizing the above-mentioned possibilities for controlling the power chip by means of the microcontroller can have the consequence that the microcontroller has to transmit a greater amount of control data to the power chip than is the case in conventional arrangements of the type described. Since, however, the control data are no longer transmitted via a bidirectional transmission channel in the arrangement presented here, this does not present any problems.

We claim:

1. An arrangement including a program-controlled unit and a power chip connected to it, wherein
   the power chip being additionally connected to electric loads and driving these electric loads in accordance with timing input to it by means of load control data,
   the program-controlled unit configured to transmit to the power chip the abovementioned load control data and control data controlling the power chip, and
   the power chip configured to transmit to the program-controlled unit diagnostic data by means of which states prevailing in the power chip or events occurring are represented, and
   wherein the program-controlled unit, by transmitting corresponding control data to the power chip, can do at least one of the following:
      input to the power chip the format of the diagnostic data to be output,
      input to the power chip when it has to output what diagnostic data,
      input to the power chip which load is to be controlled, taking into consideration which load control data section, and
      input to the power chip whether the load control data contain redundant data suitable for detecting transmission errors, and what these redundant data are.

2. The arrangement as claimed in claim 1, wherein the program-controlled unit sets the behavior of a diagnostic data output driver of the power chip which outputs the diagnostic data by transmitting corresponding control data to the power chip.

3. The arrangement as claimed in claim 2, wherein the program-controlled unit inputs to the power chip, by transmitting corresponding control data to the power chip, whether the diagnostic data output driver of the power chip operates in accordance with the push/pull method or in accordance with the open-drain method.

4. The arrangement as claimed in claim 2, wherein the program-controlled unit inputs to the power chip, by transmitting corresponding control data to the power chip, how steep the edges of the signals output by the diagnostic data output driver should be.

5. The arrangement as claimed in claim 1, wherein the program-controlled unit inputs to the power chip, by transmitting corresponding control data to the power chip, the behavior of the load control data output drivers of the power chip which output the currents and voltages to be output to the loads connected to the power chip.

6. The arrangement as claimed in claim 5, wherein the program-controlled unit inputs to the power chip, by transmitting corresponding control data to the power chip, the timing of processes running in the load control data output drivers.

7. An arrangement including a program-controlled unit and a power chip connected to it, wherein
   the power chip being additionally connected to electric loads and driving these electric loads in accordance with timing input to it by means of load control data,
   the program-controlled unit configured to transmit to the power chip the abovementioned load control data and control data controlling the power chip, and
   the power chip configured to transmit to the program-controlled unit diagnostic data by means of which states prevailing in the power chip or events occurring are represented, and
   wherein the program-controlled unit, by transmitting corresponding control data to the power chip, can do at least one of the following:
      input the behavior of output drivers of the power chip,
      configure protective mechanisms present in the power chip,
      input to the power chip the format of the diagnostic data to be output,
      input to the power chip when it has to output what diagnostic data,
      input to the power chip which load is to be controlled, taking into consideration which load control data section, and
      input to the power chip whether the load control data contain redundant data suitable for detecting transmission errors, and what these redundant data are, and
   wherein the program-controlled unit inputs to the power chip, by transmitting corresponding control data to the power chip, the behavior of load control data output drivers of the power chip which output the currents and voltages to be output to the loads connected to the power chip, the timing of processes running in the load control data output drivers, and how great the time interval is in which the drive of transistors contained in the load control data output drivers has to take place, which transistors must be brought simultaneously from the conducting into the non-conducting state or conversely, but cannot switch at the same speed and can cause a short circuit if the drive is changed simultaneously.

8. An arrangement including a program-controlled unit and a power chip connected to it, wherein
   the power chip being additionally connected to electric loads and driving these electric loads in accordance with timing input to it by means of load control data,
   the program-controlled unit configured to transmit to the power chip the abovementioned load control data and control data controlling the power chip, and
   the power chip configured to transmit to the program-controlled unit diagnostic data by means of which states prevailing in the power chip or events occurring are represented, and
   wherein the program-controlled unit, by transmitting corresponding control data to the power chip, can do at least one of the following:
      input the behavior of output drivers of the power chip,
      configure protective mechanisms present in the power chip,
      input to the power chip the format of the diagnostic data to be output,
      input to the power chip when it has to output what diagnostic data,
      input to the power chip which load is to be controlled, taking into consideration which load control data section, and input to the power chip whether the load control data contain redundant data suitable for detecting transmission errors, and what these redundant data are, and wherein the program-controlled unit inputs to the power chip, by transmitting corresponding control data to the power chip, the behavior of load control data output drivers of the power chip which output the currents and voltages to be output to the loads connected to the power chip, and how steep the edges of the signals output by the load control data output drivers have to be.

9. The arrangement as claimed in claim 1, wherein the program-controlled unit inputs to the power chip, by transmitting corresponding control data to the power chip, what states or events have to be considered as abnormal states or events.

10. The arrangement as claimed in claim 9, wherein the states or events to be considered as abnormal are input taking into consideration the behavior of the loads connected to the power chip with time.

11. An arrangement including a program-controlled unit and a power chip connected to it, wherein the power chip being additionally connected to electric loads and driving these electric loads in accordance with timing input to it by means of load control data, the program-controlled unit configured to transmit to the power chip the abovementioned load control data and control data controlling the power chip, and the power chip configured to transmit to the program-controlled unit diagnostic data by means of which states prevailing in the power chip or events occurring are represented, and wherein the program-controlled unit, by transmitting corresponding control data to the power chip, can do at least one of the following:

input the behavior of output drivers of the power chip, configure protective mechanisms present in the power chip, input to the power chip the format of the diagnostic data to be output, input to the power chip when it has to output what diagnostic data, input to the power chip which load is to be controlled, taking into consideration which load control data section, and input to the power chip whether the load control data contain redundant data suitable for detecting transmission errors, and what these redundant data are, and wherein the program-controlled unit inputs to the power chip, by transmitting corresponding control data to the power chip, how it has to respond to the detection of an abnormal state or event.

12. An arrangement including a program-controlled unit and a power chip connected to it, wherein the power chip being additionally connected to electric loads and driving these electric loads in accordance with timing input to it by means of load control data, the program-controlled unit configured to transmit to the power chip the abovementioned load control data and control data controlling the power chip, and the power chip configured to transmit to the program-controlled unit diagnostic data by means of which states prevailing in the power chip or events occurring are represented, and wherein the program-controlled unit, by transmitting corresponding control data to the power chip, can do at least one of the following:

input the behavior of output drivers of the power chip, configure protective mechanisms present in the power chip, input to the power chip the format of the diagnostic data to be output, input to the power chip when it has to output what diagnostic data, input to the power chip which load is to be controlled, taking into consideration which load control data section, and input to the power chip whether the load control data contain redundant data suitable for detecting transmission errors, and what these redundant data are, and wherein the program-controlled unit inputs to the power chip, by transmitting corresponding control data to the power chip, whether the diagnostic data are to be output together with other information and what this other information consists of.

13. The arrangement as claimed in claim 1, wherein the power chip only outputs diagnostic data following a corresponding request by the program-controlled unit.

14. An arrangement including a program-controlled unit and a power chip connected to it, wherein the power chip being additionally connected to electric loads and driving these electric loads in accordance with timing input to it by means of load control data, the program-controlled unit configured to transmit to the power chip the abovementioned load control data and control data controlling the power chip, and the power chip configured to transmit to the program-controlled unit diagnostic data by means of which states prevailing in the power chip or events occurring are represented, and wherein the program-controlled unit, by transmitting corresponding control data to the power chip, can do at least one of the following:

input the behavior of output drivers of the power chip, configure protective mechanisms present in the power chip, input to the power chip the format of the diagnostic data to be output, input to the power chip when it has to output what diagnostic data, input to the power chip which load is to be controlled, taking into consideration which load control data section, and input to the power chip whether the load control data contain redundant data suitable for detecting transmission errors, and what these redundant data are, and wherein the program-controlled unit inputs to the power chip, by transmitting corresponding control data to the power chip, what diagnostic data the power chip has to output.

15. A system comprising:

a program-controlled unit including means for generating load control data and operation control data, and means for transmitting the load control data and operation control data onto a bus; and a power chip, connected to the bus and to one or more electrical loads, for controlling said one or more electrical loads in response to the load control data received from the program-controlled unit, and for transmitting to the program-controlled unit over the bus diagnostic data identifying operating states associated with the power chip, wherein the power chip comprises at least one of:
- means, responsive to first operation control data received from the program-controlled unit, for configuring an output format of the diagnostic data transmitted onto the bus;
- means, responsive to second operation control data received from the program-controlled unit, for controlling the transmission of selected portions of the diagnostic data at selected times onto the bus;
- means, responsive to third operation control data received from the program-controlled unit, for configuring the power chip to control a selected load in response to corresponding selected bits of the transmitted load control data; and
- means, responsive to fourth operation control data received from the program-controlled unit, for configuring the power chip to identify redundant data in subsequently received load control data transmissions.

16. A system comprising:

a program-controlled unit including a generator configured to generate load control data and operation control data, and a transmitter configured to transmit the load control data and operation control data onto a bus; and a power chip, connected to the bus and to one or more electrical loads, configured to control said one or more electrical loads in response to the load control data received from the program-controlled unit, and configured to transmit to the program-controlled unit over the bus diagnostic data identifying operating states associated with the power chip, wherein the power chip comprises at least one of:
- a first unit, responsive to first operation control data received from the program-controlled unit, designed to configure an output format of the diagnostic data transmitted onto the bus;
- a second unit, responsive to second operation control data received from the program-controlled unit, designed to control the transmission of selected portions of the diagnostic data at selected times onto the bus;
- a third unit, responsive to third operation control data received from the program-controlled unit, designed to configure the power chip to control a selected load in response to corresponding selected bits of the transmitted load control data; and
- a fourth unit, responsive to fourth operation control data received from the program-controlled unit, designed to configure the power chip to identify redundant data in subsequently received load control data transmissions, and wherein the program-controlled unit inputs to the power chip, by transmitting corresponding control data to the power chip, what diagnostic data the power chip has to output.

17. A program-controlled unit, comprising:
- a microsecond bus controller configured to drive loads connected to a plurality of power chips;
- a single transmission clock signal line configured to transmit a transmission clock signal;
- a single control line which serially transmits, in time-division multiplex at the rate of the transmission clock signal, load control data and control data to the power chips; and
- a chip select line for each one of the plurality of power chips, wherein each of the chip select lines is configured to select the respective power chip to which the single control line transmits the load control data and control data, wherein load control data output within a single time window can be intended for more than one of the power chips.

18. A program-controlled unit, comprising:
- a microsecond bus controlling means for driving loads connected to a plurality of power chips;
- a single transmission clock signal line configured to transmit a transmission clock signal;
- a single control line which serially transmits, in time-division multiplex at the rate of the transmission clock signal, load control data and control data to the power chips; and
- a chip select line for each one of the plurality of power chips, wherein each of the chip select lines is configured to select the respective power chip to which the single control line transmits the load control data and control data, wherein load control data output within a single time window can be intended for more than one of the power chips.

* * * * *

UNITED STATES PATENT AND TRADEMARK OFFICE
CERTIFICATE OF CORRECTION

PATENT NO. : 7,337,343 B2
APPLICATION NO. : 10/727101
DATED : February 26, 2008
INVENTOR(S) : Jens Barrenscheen et al.

Page 1 of 1

It is certified that error appears in the above-identified patent and that said Letters Patent is hereby corrected as shown below:

In the Specification:

At column 4, line 46, "ALTINO" should read --ALTIN0--

In the Claims:

Col. 11, line 58, "behavior of the load" should read --behavior of load--

Signed and Sealed this

Seventeenth Day of June, 2008

JON W. DUDAS
*Director of the United States Patent and Trademark Office*